US010469979B2

(12) United States Patent
Bohrer et al.

(10) Patent No.: US 10,469,979 B2
(45) Date of Patent: Nov. 5, 2019

(54) MANAGING DATA ACCESS IN MOBILE DEVICES

(75) Inventors: Patrick Joseph Bohrer, Austin, TX (US); Ahmed Gheith, Austin, TX (US); James Lyle Peterson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 560 days.

(21) Appl. No.: 13/459,779

(22) Filed: Apr. 30, 2012

(65) Prior Publication Data
US 2012/0317228 A1 Dec. 13, 2012

Related U.S. Application Data

(63) Continuation of application No. 13/156,795, filed on Jun. 9, 2011, now abandoned.

(51) Int. Cl.
*G06F 15/16* (2006.01)
*H04W 4/00* (2018.01)

(52) U.S. Cl.
CPC ..................... *H04W 4/00* (2013.01)

(58) Field of Classification Search
CPC ......... H04L 43/04; H04L 67/42; H04L 67/06; H04L 67/10; H04L 67/1097; H04L 67/26; H04L 67/12; H04L 67/141; H04L 67/325; H04L 12/2812; H04L 12/2823; H04L 41/042; H04L 41/069; H04L 41/0806; H04L 47/822; H04L 47/823; H04L 51/046; H04L 63/0435; H04W 8/22; H04W 12/08; H04W 28/16; H04W 28/26; H04W 4/00; H04W 4/003; H04W 80/10; H04M 15/66; H04N 21/222; H04N 21/235; H04N 21/44209; H04N 21/472; H04N 21/6367; H04N 21/658; H04N 21/8547; G06F 9/5027; G06F 9/06; G06F 11/3476; G06F 21/51; G06F 3/165; G06F 8/65; G09G 2370/045; G09G 2370/12
USPC ........ 709/100, 203, 213–219, 223–229, 231, 709/248; 717/172; 707/10, 206, 758, 707/705
See application file for complete search history.

(56) References Cited

U.S. PATENT DOCUMENTS 8,700,804 B1 *  4/2014  Meyers et al. ................. 709/248
8,942,771 B1 *  1/2015  Ho ..................... H04W 52/0261
                                                                      455/572
2002/0083160 A1  6/2002  Middleton
(Continued)

OTHER PUBLICATIONS

Combined Search and Examination Report, AUS920110007GB1, GB1209647.5, dated Oct. 3, 2012.

*Primary Examiner* — Younes Naji
*Assistant Examiner* — Da T Ton
(74) *Attorney, Agent, or Firm* — Garg Law Firm, PLLC; Rakesh Garg; Mercedes L. Hobson

(57) ABSTRACT

A method for managing data access in a mobile device is provided in the illustrative embodiments. Using a data manager executing in the mobile device, a data item is configured in a data model. A value parameter of the data item is populated with data and a status parameter of the data item is populated with a status indication. A subscription to the data item is received from a mobile application executing in the mobile device. In response to the subscription, the data and the status of the data item are sent to the mobile application.

33 Claims, 7 Drawing Sheets

(56) References Cited

U.S. PATENT DOCUMENTS

| | | | |
|---|---|---|---|
| 2002/0188766 A1* | 12/2002 | Vuppula | 709/318 |
| 2004/0111421 A1* | 6/2004 | Cohen | G06Q 10/10 |
| 2004/0148375 A1* | 7/2004 | Levett | G06F 9/46 |
| | | | 709/223 |
| 2005/0138574 A1* | 6/2005 | Lin | G06F 3/04817 |
| | | | 715/811 |
| 2007/0067373 A1* | 3/2007 | Higgins et al. | 707/206 |
| 2007/0113031 A1* | 5/2007 | Brown et al. | 711/160 |
| 2007/0220220 A1 | 9/2007 | Ziv et al. | |
| 2008/0077656 A1 | 3/2008 | Broda | |
| 2008/0127211 A1* | 5/2008 | Belsey et al. | 719/315 |
| 2008/0306888 A1* | 12/2008 | Dorai et al. | 706/12 |
| 2009/0077263 A1* | 3/2009 | Koganti | G06F 16/27 |
| | | | 709/248 |
| 2009/0117925 A1* | 5/2009 | De Bonis | G06F 17/30029 |
| | | | 455/466 |
| 2009/0119773 A1* | 5/2009 | D'Amore et al. | 726/21 |
| 2009/0138477 A1* | 5/2009 | Piira | H04L 67/34 |
| 2009/0210631 A1 | 8/2009 | Bosworth et al. | |
| 2010/0080187 A1* | 4/2010 | Papasakellariou et al. | 370/329 |
| 2010/0161101 A1* | 6/2010 | Pouyez et al. | 700/108 |
| 2011/0196884 A1* | 8/2011 | Gandhi et al. | 707/758 |
| 2011/0197032 A1* | 8/2011 | Patey | G06F 16/24552 |
| | | | 711/133 |
| 2011/0209138 A1* | 8/2011 | Monteith et al. | 717/172 |

\* cited by examiner

FIG. 4

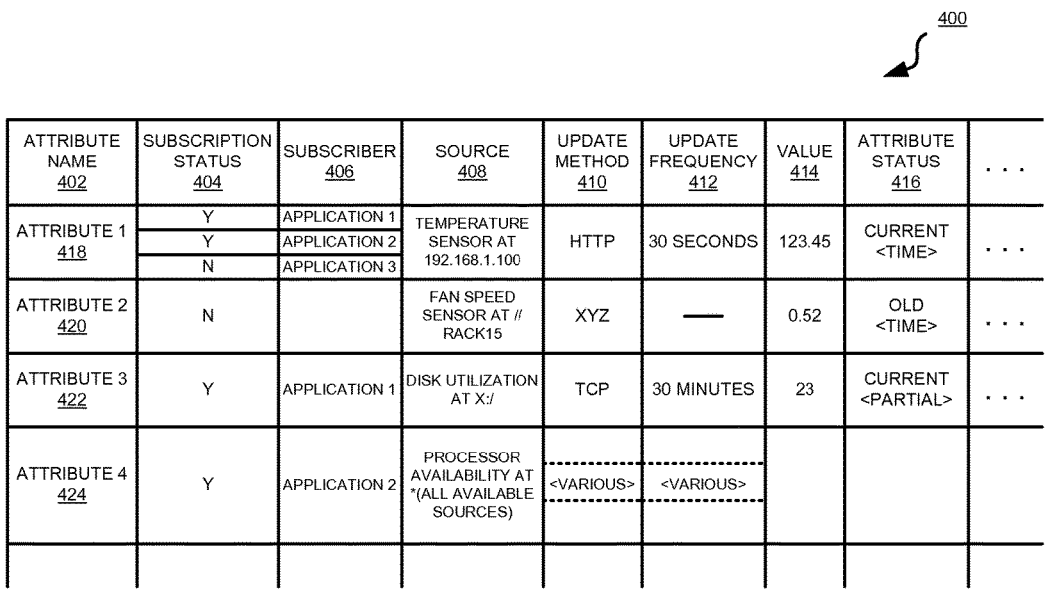

| ATTRIBUTE NAME 402 | SUBSCRIPTION STATUS 404 | SUBSCRIBER 406 | SOURCE 408 | UPDATE METHOD 410 | UPDATE FREQUENCY 412 | VALUE 414 | ATTRIBUTE STATUS 416 | ... |
|---|---|---|---|---|---|---|---|---|
| ATTRIBUTE 1 418 | Y | APPLICATION 1 | TEMPERATURE SENSOR AT 192.168.1.100 | HTTP | 30 SECONDS | 123.45 | CURRENT <TIME> | ... |
|  | Y | APPLICATION 2 |  |  |  |  |  |  |
|  | N | APPLICATION 3 |  |  |  |  |  |  |
| ATTRIBUTE 2 420 | N |  | FAN SPEED SENSOR AT // RACK15 | XYZ | — | 0.52 | OLD <TIME> | ... |
| ATTRIBUTE 3 422 | Y | APPLICATION 1 | DISK UTILIZATION AT X:/ | TCP | 30 MINUTES | 23 | CURRENT <PARTIAL> | ... |
| ATTRIBUTE 4 424 | Y | APPLICATION 2 | PROCESSOR AVAILABILITY AT *(ALL AVAILABLE SOURCES) | <VARIOUS> | <VARIOUS> |  |  |  |
|  |  |  |  |  |  |  |  |  |

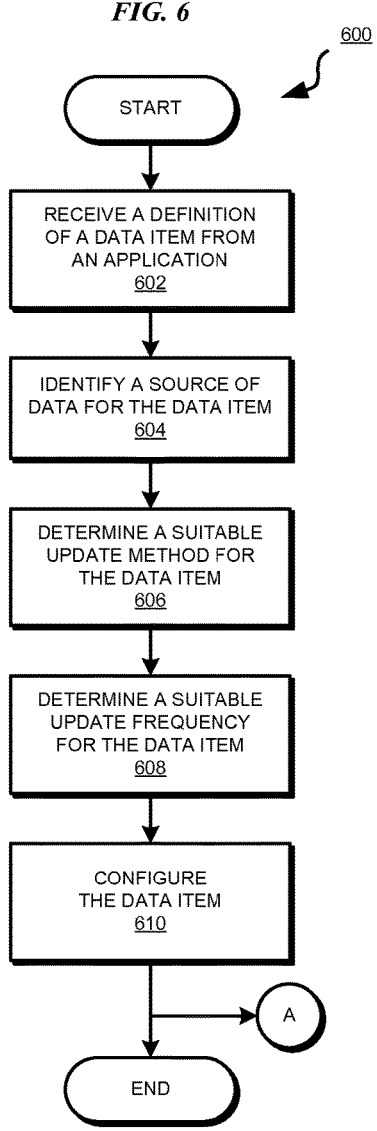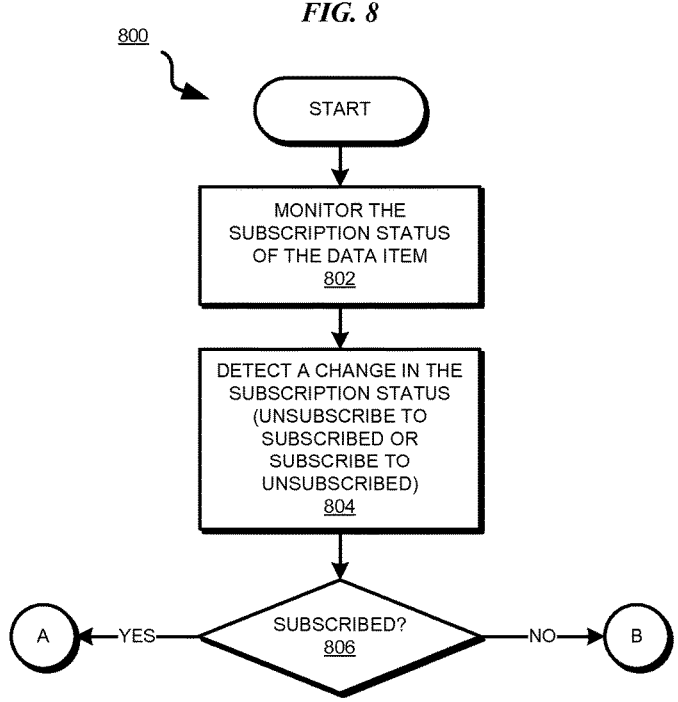

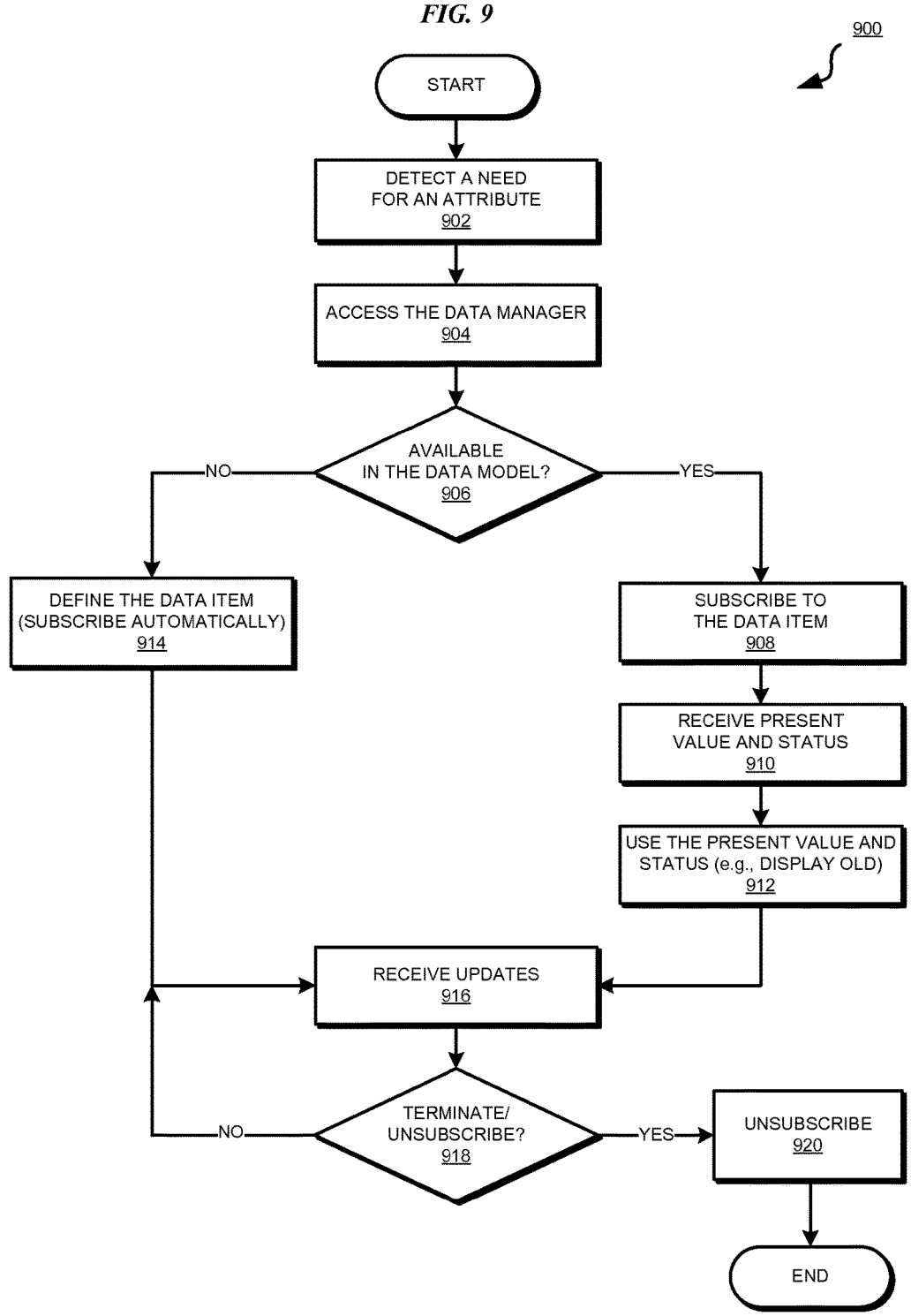

MANAGING DATA ACCESS IN MOBILE DEVICES

The present application is a CONTINUATION of copending patent application Ser. No. 13/156,795.

BACKGROUND

1. Technical Field

The present invention relates generally to a computer implemented method for accessing data. More particularly, the present invention relates to a computer implemented method for managing data access in mobile devices.

2. Description of the Related Art

As the workforce becomes increasingly mobile, more and more demands are being placed on software applications that execute on mobile computing platforms. Some mobile computing platforms, such as laptop computers, are fully functional computers, which are often connected to a high bandwidth wired or wireless network.

Mobile devices, such as smartphones or mobile communication devices are quickly becoming a popular alternative to laptop computers. Applications are being designed for the mobile devices that bring complex functionality and operations to the mobile devices in a mobile data network environment.

Some mobile applications, that is, applications executing on mobile devices, need efficient access to significant volumes of data. The data volume and the rate of change of data is such that a mobile device may not be able to store the entire dataset or keep the data up-to-date because of memory, communication bandwidth, communication availability, and energy conservation constraints.

The mobile applications are becoming increasingly sophisticated and data intensive. The mobile users expect similar responsiveness and functionality from applications on mobile devices as expected from more capable computing platforms and data networks. Even as the data communication capabilities of mobile networks, such as the cellular networks, improve, the demands on such networks are ever increasing.

SUMMARY

The illustrative embodiments provide a method for managing data access in mobile devices. An embodiment configures, using a data manager executing in the mobile device, a data item in a data model. The embodiment populates a value parameter of the data item with data and a status parameter of the data item with a status indication. The embodiment receives a subscription to the data item from a mobile application executing in the mobile device. The embodiment sends, responsive to the subscription, the data and the status of the data item to the mobile application.

Another embodiment further receives an update for the data item. The embodiment updates the data in value parameter of the data item. The embodiment determines whether the status indication should be changed because of the update, forming a status determination. The embodiment adjusts the status parameter with a second status indication responsive to the status determination being affirmative. The embodiment pushes contents of the updated value parameter and the adjusted status parameter to the mobile application. The embodiment causes a use of the value parameter to change in the mobile application due to the adjusted status parameter.

In another embodiment, the data in the value parameter is computed using the update. The embodiment further repeats the receiving, the updating, the determining, and the adjusting responsive to an update frequency period specified for the data item elapsing.

Another embodiment further receives, from the mobile application executing in the mobile device, a request to unsubscribe from the data item. The embodiment unsubscribes the mobile application from the data item. The embodiment determines whether a second mobile application is subscribed to the data item. The embodiment receives an update for the data item responsive to the second mobile application being subscribed to the data item. The embodiment discontinues the update for the data item responsive to no subscriptions remaining for the data item.

In another embodiment, the mobile application and the second mobile application use the update at different frequencies, wherein the update is received at a source's frequency, and wherein the update and a status indication from the data item are pushed to the mobile application and the second mobile application at their respective frequencies.

In another embodiment, the configuring configures a subset of a set of parameters of the data item. The embodiment further configures, using the mobile application, another subset of the set of parameters of the data item, wherein the data item is not previously configured in the data model.

In another embodiment the configuring further identifies a source of data for the data item, determines an update method for the data item, and determines an update frequency for the data item, wherein the source, the update method, and the update frequency are provided to the data manager and not to the mobile application.

Another embodiment further uses a policy to adjust an update frequency of the data item, or prioritize an update of the data item.

Another embodiment further uses a policy to determine the mobile application's entitlement to the data item, wherein the policy is used for denying the mobile application from subscribing to the data item.

In another embodiment, the policy uses a combination of an identity of the application, an identity of the mobile device, and a history of previous actions by the mobile application to determine the entitlement.

Another embodiment further allows a second mobile application executing in a second mobile device access to the data item by sending the date item to a second data manager in the second mobile device such that the second data manager does not have to receive an update to the data item from a designated source of the data item.

In another embodiment, the data manager uses a combination of subscriptions to the data item, parameters of the data item, and available memory at the mobile device to purge the data item.

Another embodiment further causes the provision of a cue at the mobile application based on a status indication in a status parameter of a data item, wherein the cue indicates in the mobile application that a value associated with the data item is out of date.

Another embodiment further pre-fetches an update for the data item, the pre-fetching being based on a subscription history of the data item.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a block diagram of an example data model in accordance with an illustrative embodiment;

FIG. 6 depicts a flowchart of an example process for managing data access in mobile devices in accordance with an illustrative embodiment;

FIG. 8 depicts a flowchart of managing data acquisition bases on subscriptions in a mobile device in accordance with an illustrative embodiment; and FIG. 9 depicts a flowchart of a process for using data in a mobile device in accordance with an illustrative embodiment.

DETAILED DESCRIPTION

Figure 1:
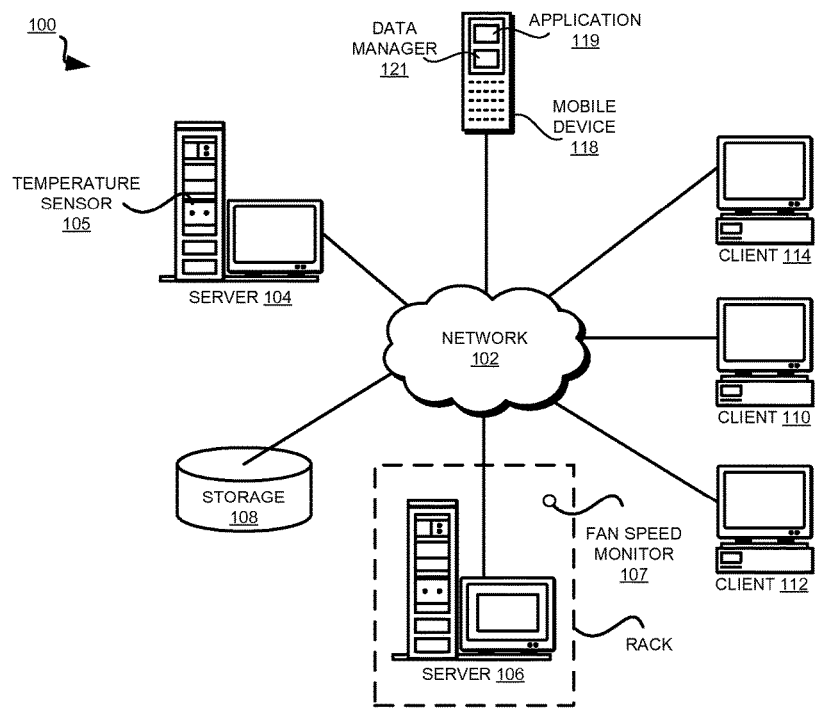
FIG. 1 depicts a pictorial representation of a network of data processing systems in which illustrative embodiments may be implemented.

The invention recognizes that the qualities of the mobile device, the mobile application, the mobile network, and the data sources all contribute to the effectiveness of mobile computing. A data source is a system, device, instrumentation, or equipment, including but not limited to computers or data processing systems, that provides data.

The invention recognizes that even if the computing capabilities of mobile devices rival those of desktop or laptop computers, and even if mobile networks' performance becomes comparable to wired or wireless data networks, some data sources cannot be converted to active or interactive data providers. Furthermore, many data sources cannot match the data rate or the efficiency of data communication when communicating with increasingly sophisticated, responsive, or interactive applications on mobile device.

Existing systems attempt to hide the latency in data communications with data sources by caching data on the provider side of the network. In other words, a mobile application (a client-side application) interacts not with a data source but from an intermediary source-side (server-side) system or application that masks the actual data source's data latency, legacy capabilities, or both.

The invention recognizes that server-side caching has several disadvantages. For example, even with the server-side caching enabled, the cache may not contain the data that a mobile application needs. In such a case, the server-side caching becomes ineffective and the mobile application performance suffers.

The illustrative embodiments used to describe the invention generally address and solve the above-described problems and other problems related to mobile applications. The illustrative embodiments provide a method for managing data access in mobile devices. The illustrative embodiments describe a client-side data management technique to improve the responsiveness and readiness of mobile applications and to improve the user-experience resulting there from.

Using an illustrative embodiment, a mobile application executing on a mobile device (client-side) interacts with one or more data sources through a client-side data management configuration comprising a data manager and a data model as described in detail herein. The data manager together with the data model interacts with data sources directly or through any existing intermediaries.

According to an embodiment, the responsiveness of the mobile application is improved because the mobile application requests and receives data from a client-side data management configuration. The client-side data management configuration effectively makes a passive data source appear as an active data source. A passive data source is a data source that does not provide data on its own initiative, but from which the data has to be requested. An active data source is a data source that proactively provides data.

The client-side data management configuration requests the data from passive data sources in the background such that updated data is available to the mobile application and the application logic need not be aware of whether a new request has to be made for an update. Even an active data source may be incompatible with a mobile application in that the active data source may provide the data at a rate that is different from a rate at which the mobile application can consume the data. The data management configuration on the client-side according to an embodiment can facilitate the data rate or update frequency discrepancy between data sources and the one or more mobile applications that may use their data.

The illustrative embodiments are described with respect to certain data, data structures, file-systems, file names, directories, and paths only as examples. Such descriptions are not intended to be limiting on the invention. For example, an illustrative embodiment described with respect to one form of local application name and path can be implemented as an application on a different form of path or name within the scope of the invention.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are further described with respect to certain applications only as examples. Such descriptions are not intended to be limiting on the invention. An embodiment of the invention may be implemented with respect to any type of application, such as, for example, applications that are served, the instances of any type of server application, a platform application, a stand-alone application, an administration application, or a combination thereof.

An application may further include data objects, code objects, encapsulated instructions, application fragments, services, and other types of resources available in a data processing environment. For example, a Java® object, an Enterprise Java Bean (EJB), a servlet, or an applet may be manifestations of an application with respect to which the invention may be implemented. (Java and all Java-based trademarks and logos are trademarks or registered trademarks of Oracle and/or its affiliates).

The illustrative embodiments are described using specific code, designs, architectures, layouts, schematics, and tools only as examples and are not limiting on the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting on the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
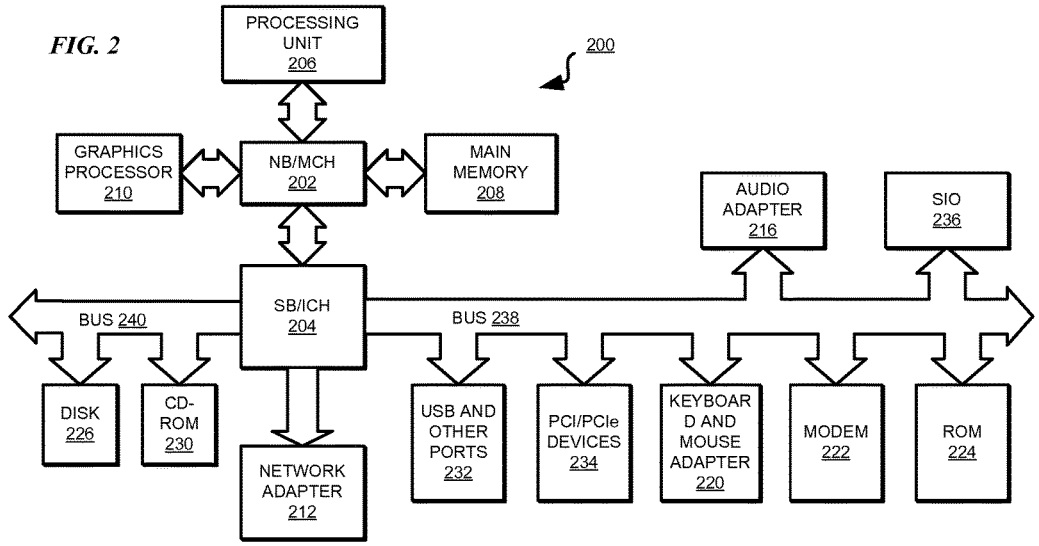
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Mobile device 118 may be any suitable mobile device communicating with network 102. Some examples of mobile device 118 may be smartphones, mobile phones, personal digital assistants, mobile communication devices, limited purpose mobile computing devices, wearable mobile devices, or devices whose primary use may be other than as a computer. Application 119 may be a mobile application executing on mobile device 118. Data manager 121 may be a data manager according to an embodiment, interacting with a data model (not shown) according to an embodiment. Temperature sensor 105 in server 104 or fan speed monitor 107 in a rack where server 106 may be mounted are some examples of passive data sources.

A storage array used in storage 108 is an example of a passive data source under some circumstances, and an active data source under different circumstances. For example, one type of storage array may provide disk utilization information only upon request. Another type of storage array may provide the disk utilization on a periodic basis or upon some event, without an explicit request.

The examples of the active and passive data sources are not intended to be limiting on the invention. Generally, any data source may behave as a passive data source under some circumstances and as an active data source under different circumstances without limitation.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes of the illustrative embodiments may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States, other countries, or both), or Linux® (Linux is a trademark of Linus Torvalds in the United States, other countries, or both). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle and/or its affiliates).

Program instructions for the operating system, the object-oriented programming system, the processes of the illustrative embodiments, and applications or programs are located on storage devices, such as hard disk drive 226, and may be loaded into a memory, such as, for example, main memory 208, read only memory 224, or one or more peripheral devices, for execution by processing unit 206. Program instructions may also be stored permanently in non-volatile memory and either loaded from there or executed in place. For example, the synthesized program according to an embodiment can be stored in non-volatile memory and loaded from there into DRAM.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
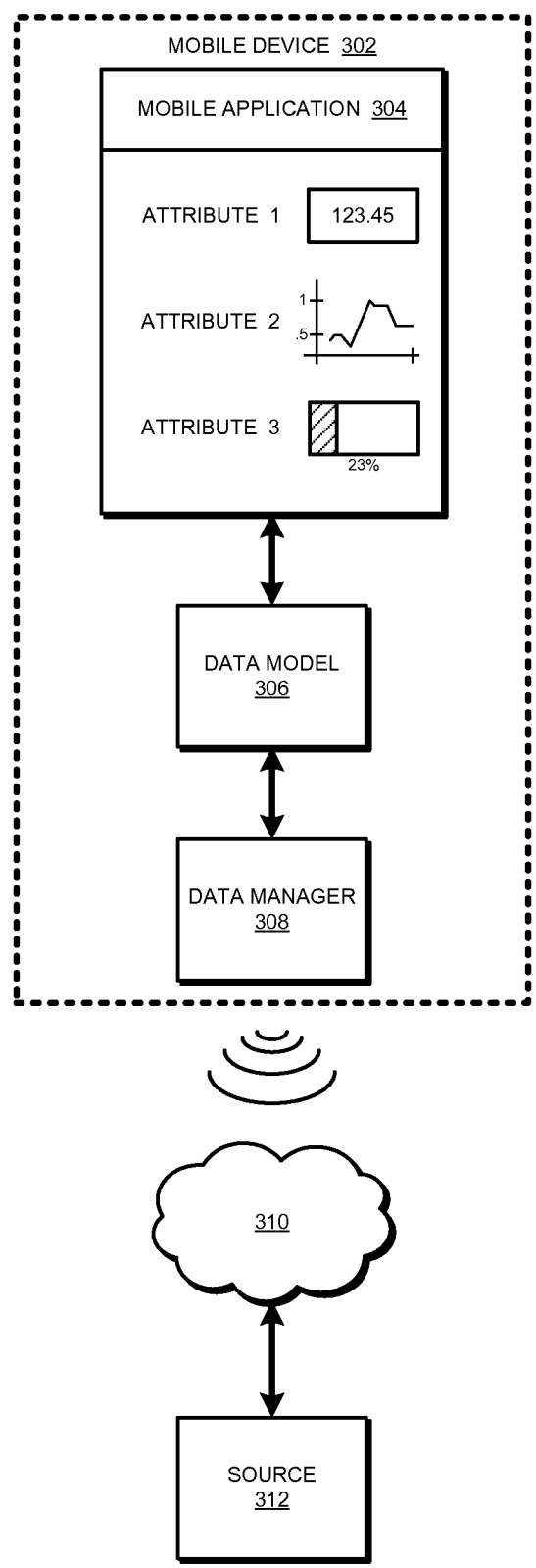
FIG. 3 depicts a block diagram of a client-side data management configuration for managing data access in a mobile device in accordance with an illustrative embodiment.

With reference to FIG. 3, this figure depicts a block diagram of a client-side data management configuration for managing data access in a mobile device in accordance with an illustrative embodiment. Mobile device 302 may be analogous to mobile device 118 in FIG. 1. Mobile application 304 may be implemented using application 119 in FIG. 1.

Data model 306 and data manager 308 together form a client-side data management configuration. Data manager 308 may use the mobile communication capabilities of mobile device 302 to communicate over network 310. Source 312 may be a data source. Source 312 may be a passive data source, an active data source, or a combination thereof.

Data model 306 is a local data structure on mobile device 302. Data manager 308, among other functions as described elsewhere in this disclosure, manages data model 306. Data model 306 presents an active view of data that may be acquired from passive data sources such as one embodiment of source 312. Data model 306 also presents an active view of data that may be acquired from active data sources, such as another embodiment of source 312, whose data rate or update frequency may not match those of mobile application 304 or may be unknown to mobile application 304.

As an example, "attribute 1", "attribute 2", and "attribute 3" may be example data that may be acquired from one or more source 312 for use in mobile application 304. Mobile application 304 may use "attribute 1", "attribute 2", and "attribute 3" as shown in mobile application 304's operations. For example, mobile application 304 may display, plot, or graph the values of these attributes and their updates.

Mobile application 304 interacts with data model 306 to identify itself as a receiver of certain data, for example the depicted "attribute 1", "attribute 2", and "attribute 3" data. The process of identifying mobile application 304 as a receiver of certain data in data model 306 is called a subscription process. The identification is called a subscription. For example, mobile application 304 has a subscription to "attribute 1" to display the current and updated values of "attribute 1". Mobile application 304 unsubscribes to a particular data in data model by removing or deactivating its subscription to such data.

Mobile application 304 is described as configuring to receive "attribute 1", "attribute 2", and "attribute 3" only as an example without limiting the scope of the invention. Any number of mobile application(s) 304 may configure information about any type and any number of data items in data model 306 they wish to receive. Any number of mobile application(s) 304 may subscribe to a particular data item configured in data model 306.

Data manager 308 further configures the data items present in data model 306. For example, data manager 308 may configure a data item in data model 306 with further information about the address, protocol, update rate, and any other suitable aspect of data exchange needed for receiving that data item from the appropriate source 312.

Data manager 308 also implements policies governing data model 306. For example, some policies may define the operations that mobile application 304 is allowed to perform on data model 306. Other example policies may define how a particular source 312 is to be accessed or a particular data item received from a particular source 312. Other example policies may define how and when a data item is to be purged from data model 306 or retained therein. Any number and type of policies may be implemented using data manager 308.

Given these examples of the policies, many other policies will become apparent to those of ordinary skill in the art and the same are contemplated within the scope of the invention. For example, mobile application 304 may subscribe or unsubscribe to the various data items in data model 306 according to a certain policy. As another example, data manager 308 may use a policy about the subscription information at a given time to determine whether to update a certain data item, retain the data item's configuration in data model 306, or purge the data item from data model 306.

Mobile application 304 may subscribe or unsubscribe to a data item in data model 306 dynamically based on application logic, user preferences, and the current user view in mobile application 304. In one embodiment, when mobile application 304 is subscribed to a particular data item in data model 306, data manager 308 may acquire updates for that data item and push the updated data item to mobile application 304.

Data manager 308 may consolidate or modify data requests to one or more source 312 depending upon which mobile application(s) 304, and what number of them, may be using a particular data item. For example, data manager 308 may aggregate subscriptions from different mobile applications 304 and optimize the use of the bandwidth, memory, and energy available to mobile device 302 while meeting the needs of mobile application 304 or its user.

A data item may be represented in any suitable form in data model 306. For example, a data item may be a string, Boolean value, an integer or floating point number, a data structure, a data object, a class or an object thereof, code, or any data form suitable for a given implementation.

Furthermore, a data item may be configured in data model 306 with one or more indications (status), such as for urgency, age, completeness, reliability, disclaimers, applicable policy, rate of change, priority, or any other indication suitable for a given data item in a given implementation. Data manger 308 may modify such indications, and mobile application 304 may use such indications when using the associated data item.

Data manager 308 may be pre-configured or configured on-the-fly with information about accessing various source(s) 312. Such information may include knowledge of how to obtain and refresh data items from a certain source 312 over a particular combination of data networks.

With reference to FIG. 4, this figure depicts a block diagram of an example data model in accordance with an illustrative embodiment. Data model 400 may be used as data model 306 in FIG. 3.

A row in data model 400 holds the information for one data item. A column in data model 400 defines a parameter of a data item in a particular row. A parameter of a data item can have multiple values. For example, where multiple values are possible for a parameter (column) of a data item (row), data model 400 shows them as multiple row entries in a cell under that parameter (column). Where multiple row entries are indicated in some cells of a particular row, those rows can be implemented as separate rows for each distinct row entries. Data model 400 may include any number of columns and rows, and any number of row entries for a particular data item for a particular parameter.

In the example depicted in this figure, data model 400 is shown to include column 402 to identify an "attribute name" parameter of a data item. An attribute name of a data item is the name by which the data item can be referenced.

Column 404 identifies a "subscription status" parameter of a data item. A subscription status indicates whether a data item has been subscribed to by some mobile application.

Column 406 identifies a "subscriber" parameter of a data item. A subscriber identifies or references the mobile application that has presently or previously subscribed to a data item.

Column 408 identifies a "source" parameter of a data item. A source identifies or references the source that has can provide the data for that data item.

Column 410 identifies an "update method" parameter of a data item. An update method identifies or references a method to be used with the source of column 408 to acquire the data for that data item. An update method may be a protocol, a routing, a conversion, a query, a request, a specification, or any other similarly usable information for requesting information from a source.

Column 412 identifies an "update frequency" parameter of a data item. An update frequency specifies how often the data for the data item should be updated. Update frequency may be specified in any manner suitable to a particular implementation without departing the scope of the invention.

Column 414 identifies a "value" parameter of a data item. A value of a data item is the data of that data item.

Column 416 identifies an "attribute status" parameter of a data item. An attribute status specifies the status of the value of the data item. Some examples of the attribute status may be an indication of urgency, age, completeness, reliability, disclaimers, applicable policy, rate of change, priority, or any other indication suitable for a given data item in a given implementation.

These columns are not limiting on the invention. Any number of columns may be similarly configured in data model 400 within the scope of the invention.

For example, row 418 defines the data item "attribute 1" which has been presently subscribed to by mobile applications "application 1" and "application 2." Attribute 1 was previously subscribed to (and is currently unsubscribed from) by mobile application "application 3." The source of "attribute 1" is a temperature sensor at (a machine located at) an IP address 192.168.1.100. The method to use for acquiring "attribute 1" from that source is over Hypertext transport protocol (HTTP). The temperature data for "attribute 1" should be acquired every 30 seconds. The last received value for "attribute 1" was "123.45" in some designated unit of measurement. The status of "attribute 1" is current (as of an optional time stamp), which means that the value "123.45" is a current value for "attribute 1."

Row 420 defines a data item "attribute 2" to which no mobile application is currently subscribing. The source of "attribute 2" is a fan speed sensor at a rack reachable using address "//rack15" over the local area network. The update method to use with this source is "xyz." No update frequency is specified because no mobile application is currently subscribing to this data item and updating this data item would waste data communication bandwidth. "Attribute 2" had the last received value of "0.52". That value of "attribute 2' is older than a specified threshold and should not be relied upon. For example, a mobile application that subscribes to "attribute 2" may begin by displaying the old value of "attribute 2" but may use the "old" status to exclude that value from any decision making process until it receives the current value for "attribute 2".

Data item 422 is "attribute 3" to which mobile application "application 1" is currently subscribing. "Attribute 3" is a disk utilization of one or more drives mapped to path "X:/"

in a network. "Attribute 3" should be updated using TCP every 30 minutes. The last received (current) value of "attribute 3" is 23 (percentage or any other unit of measure). The current value for "attribute 3" is "partial" in that while the value is current, the disk utilization computation at "X:/" has not completed and that source reports the utilization to be 23 percent up to this point in the utilization computation.

Data item 424 is "attribute 4" to which mobile application "application 2" is subscribing. "Attribute 4" is the processor availability at all available sources (indicated by the wildcard character "*"). Accordingly, the update method for "attribute 4" varies depending upon which of the various available sources is being queried. The frequency of update may also vary depending upon the source. The value and status of the value also varies depending upon which source's processor availability is being held in "attribute 4".

Data items like data item 424 can be implemented in several different ways. For example, data item 424 can be a data structure comprising multiple rows in data model 400 to hold each parameter combination for "attribute 4" separately. As another example, data item 424 can be a single row whose parameters periodically cycle through all possible combinations. As another example, data item 424 may be a single row with multiple row entries in columns 410, 412, 414, and 416.

The specific columns, rows, row entries, and the parameter values described above are only examples to illustrate the configuration of data model 400. Those of ordinary skill in the art will be able to configure more, less, or different artifacts in an implementation of data model 400 based on this description and the same are contemplated within the scope of the invention.

Figure 5:
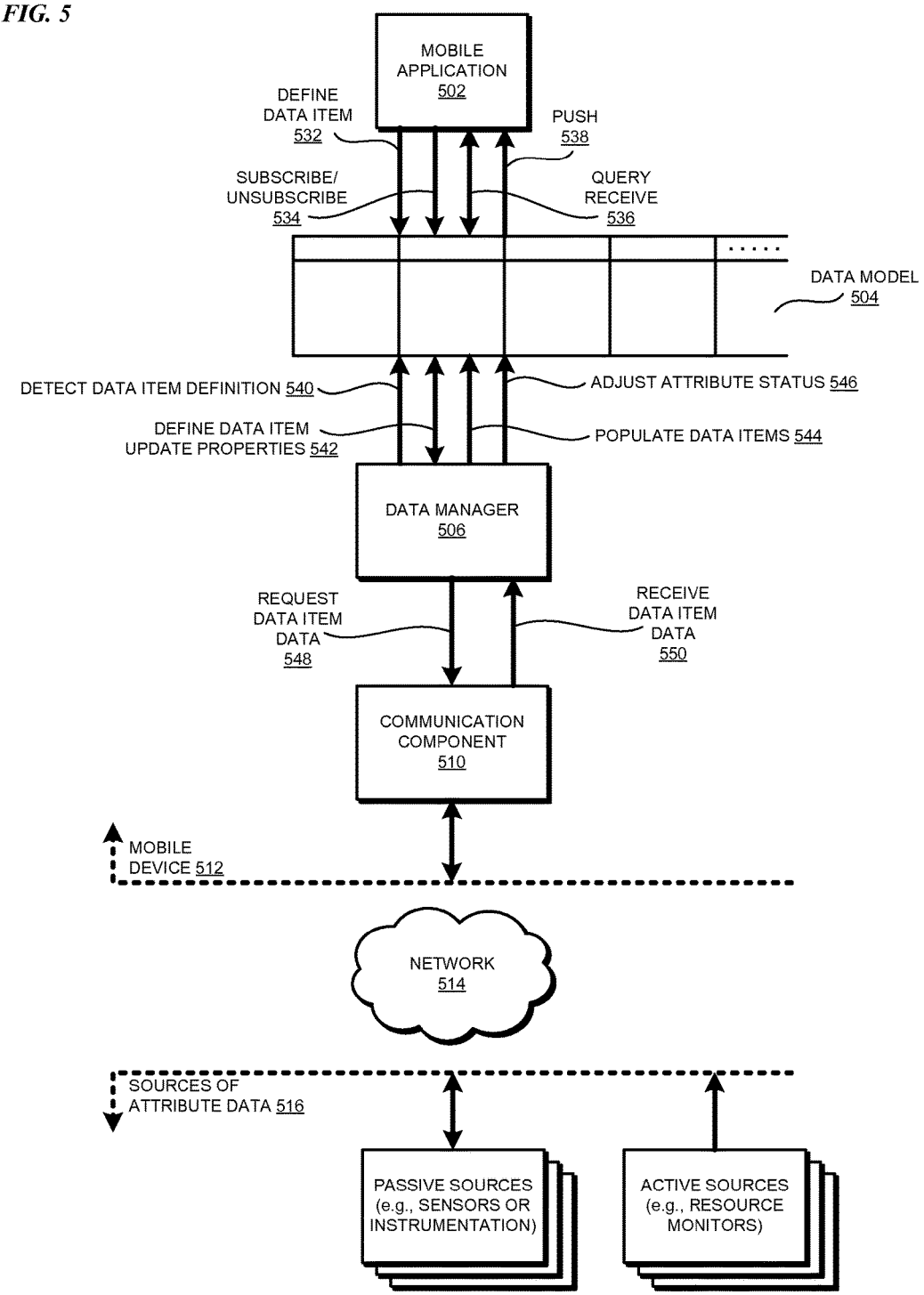
FIG. 5 depicts a block diagram of an example process of managing data access in mobile devices in accordance with an illustrative embodiment.

With reference to FIG. 5, this figure depicts a block diagram of an example process of managing data access in mobile devices in accordance with an illustrative embodiment. Mobile application 502 may be analogous to mobile application 304 in FIG. 3, or any of "application 1" "application 2" or "application 3" identified in rows 418-424 in FIG. 4. Data model 504 may be implemented using data model 400 in FIG. 4. Data manager 506 may be analogous to data manager 308 in FIG. 3.

Communication component 510 may be a communication device or component of mobile device 512 in which mobile application 502, data model 504, and data manager 506 may be stored or executing. Network 514 may be any data network over which data items in data model 504 may be acquired. Any number of sources 516 may be able to provide such data items to data model 504 over network 514. Source 516 may comprise any combination of active sources or passive sources. Some examples of active sources 516 may be resource monitors for various type of computing resources in various data processing systems. Some examples of passive sources 516 may be sensors and facilities management instrumentation, such as controls, meters and gauges, or switches.

Mobile application 502 may perform certain operations against some or all or the parameters of one or more data items in data model 504. Data manager 506 may also perform certain operations against some or all or the parameters of one or more data items in data model 504. For example, in one embodiment, mobile application 502 may configure columns 402, 404, and 406 for row 422 in data model 400 of FIG. 4 (used as data model 504) and data manager 506 may configure parameters 408, 410, 412, 414, and 416 for that row.

Thus, mobile application 502 may define 532 a data item, subscribe or unsubscribe 534 to a data item, or query and receive 538 value of a data item. Mobile application 502 may also receive the value of a data item as a result of push 538 operation initiated from data model 504 by data manager 506.

Data manager 506 may detect 540 a data item being defined. Data manager 506 may further define or update 542 a data item, populate 544 the data item's parameters, and adjust 546 the attribute status of the data item. Data manager 506 requests 548 data for a data item, and receives 550 the requested data from any of sources 516.

With reference to FIG. 6, this figure depicts a flowchart of an example process for managing data access in mobile devices in accordance with an illustrative embodiment. Process 600 may be implemented in a data manager, such as data manager 506 in FIG. 5.

Process 600 begins by receiving a definition (or an indication thereof) of a data item from a mobile application in a data model (step 602). Process 600 identifies a source of data for the data item (step 604). Process 600 determines a suitable update method for the data item (step 606). Process 600 determines a suitable update frequency for the data item (step 608).

Process 600 configures the data item in the data model with the information determined or identified in steps 604, 606, and 608 (step 610). Process 600 may then end thereafter. Alternatively, process 600 may proceed to exit labeled "A", to enter another process, such as process 700 in FIG. 7, having a corresponding entry point labeled "A".

Figure 7:
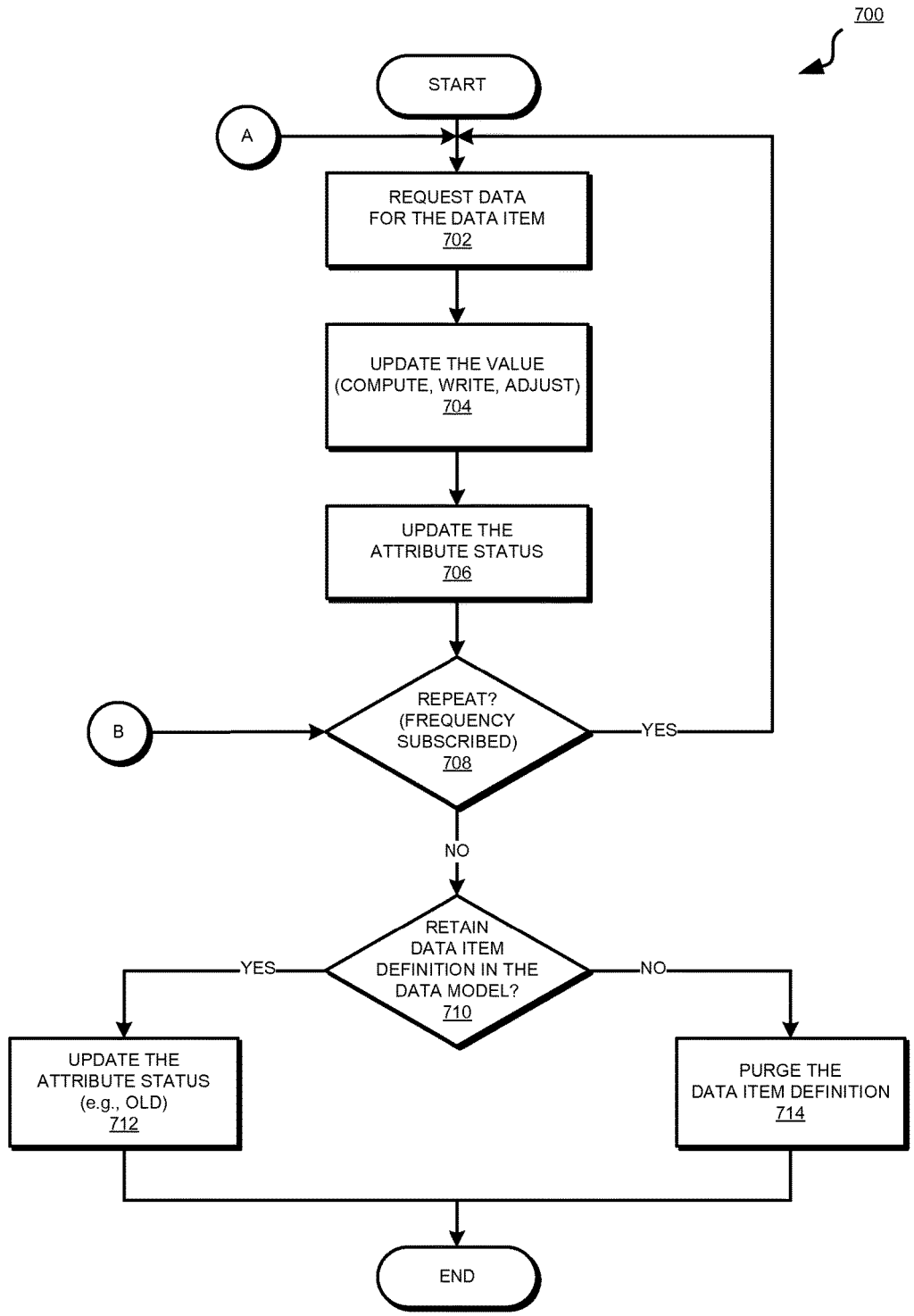
FIG. 7 depicts a flowchart of another process for managing data access in mobile devices in accordance with an illustrative embodiment.

With reference to FIG. 7, this figure depicts a flowchart of another process for managing data access in mobile devices in accordance with an illustrative embodiment. Process 700 may be implemented in a data manager, such as data manager 506 in FIG. 5.

Process 700 begins by requesting the data for a data item configured in a data model (step 702). For example, step 702 may be performed for the data item defined in step 602 and further configured in step 610 in FIG. 6. Another process, such as process 600 in FIG. 6 or process 800 in FIG. 8, may enter process 700 at the entry point labeled "A".

Process 700 updates the value parameter of the data item, such as by performing some computation based on the data received, writing the value to a memory location, or adjusting the contents of a data storage area (step 704). Process 700 updates the attribute status parameter of the data item with a suitable indication (step 706).

Process 700 determines whether to repeat the data acquisition and update process for the data item (step 708). For example, the data acquisition and update may be repeated if an update frequency so warrants or a mobile application subscribes to the data item. Another process, such as process 800 in FIG. 8, may enter process 700 at entry point labeled "B". If the data acquisition and update should be repeated for the data item ("Yes" path of step 708), process 700 returns to step 702.

If the data acquisition and update is not to be repeated ("No" path of step 708), process 700 determines whether to retain the data item's definition in the data model (step 710). For example, in one embodiment, when a data item is not subscribed to by any mobile application for a predetermined period, the definition of the data item may be purged from the data model. As another example, if a source of data for a data item no longer exists or provides that data, the corresponding data item's definition may be purged. Many other reasons or policies for purging a data item definition will become apparent from this disclosure to those of ordinary skill in the art and the same are contemplated within the scope of the invention.

If the definition is to be retained, such as by execution of a policy by a data manager ("Yes" path of step 710), process 700 updates the attribute status of the data item, such as by indicating the data of the data item to be "old" after a period has elapsed (step 712). Process 700 ends thereafter.

If the definition is to be purged, such as by execution of a policy by a data manager ("No" path of step 710), process 700 purges the definition of the data item from the data model (step 714). Process 700 ends thereafter.

With reference to FIG. 8, this figure depicts a flowchart of managing data acquisition bases on subscriptions in a mobile device in accordance with an illustrative embodiment. Process 800 may be implemented in a data manager, such as data manager 506 in FIG. 5.

Process 800 begins by monitoring the subscription status of a data item in a data model (step 802). Process 800 detects a change in the subscription status, for example, a change from unsubscribed to subscribed, or from subscribed to unsubscribed status of the data item (step 804).

Process 800 determines whether the subscription status as changed indicates that the data item has been subscribed to by a mobile application (step 806). If a mobile application has subscribed to the data item ("Yes" path of step 806), process 800 exists at exit point labeled "A" and enters another process, process 700 in FIG. 7, at a corresponding entry point labeled "A". If a mobile application has unsubscribed from the data item ("No" path of step 806), process 800 exists at exit point labeled "B" and enters another process, process 700 in FIG. 7, at a corresponding entry point labeled "B".

With reference to FIG. 9, this figure depicts a flowchart of a process for using data in a mobile device in accordance with an illustrative embodiment. Process 900 may be implemented in a mobile application, such as mobile application 502 in FIG. 5.

Process 900 begins by detecting a need for an attribute or a particular data (step 902). Process 900 accesses a data manager, such as data manager 506 in FIG. 5, to determine whether the attribute or data is available in a data model, such as data model 504 in FIG. 5 (step 904). In one embodiment, process 900 may access the data model directly for making the determination of step 904.

Process 900 determines whether the requested data is configured and available in the data model (step 906). If the data is available in the data model ("Yes" path of step 906), process 900 subscribes to the corresponding data item (step 908).

Process 900 receives the presently available value and status of the data item (step 910). Process 900 uses the present value according to the associated attribute status (step 912). Receiving and using an existing value allows a mobile application to initiate a use of the data from some value as opposed to no value at all. For example, a user may prefer seeing at least a last known value instead of a blank data field until the data is refreshed.

If the data is not available in the data model ("No" path of step 906), process 900 defines a data item for the desired data (step 914). Process 900 receives updates to the value of the data item as they become available in the data model, such as by being pushed from the data model to the mobile application (step 916). Process 900 also executes step 916 following step 912.

Process 900 determines whether to terminate or unsubscribe from the data item, such as when the mobile application exists, or no longer requires the data of the data item (step 918). If process 900 determines to continue the subscription ("No" path of step 918), process 900 returns to step 916. If process 900 decides to terminate or unsubscribe ("Yes' path of step 918), process 900 unsubscribes from the data item (step 920). Process 900 ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method is provided in the illustrative embodiments for managing data access in mobile devices. Using an embodiment of the invention, persistent local data model in the mobile device allows a view of the data therein even when a source of the data is offline. Using an embodiment, a passive data source can be made to appear as active with respect to a mobile application executing on the mobile device. When the mobile application cannot communicate adequately with an active source, an embodiment can transparently synchronize the data updates as provided by the source and as needed by the application without changing either the source or the application's configurations.

The policy based implementation of the data manager and the data model according to an embodiment allows for dynamic configuration changes as data source come online or go offline without the mobile application caring for the details of source management. The policy based implementation further allows the data access from the mobile device to occur such that the bandwidth and storage space available to the mobile device are optimally utilized for the desired user-experience in the mobile application.

Furthermore, an embodiment may be used in conjunction with a data source that is capable of sending an indication when new data, updated data, or modified data is available at that data source. In the prior art, the mobile application would have to keep an open connection to the data source to receive the updated or new data, which is a disadvantageous use of mobile data bandwidth. By using an embodiment, a mobile application can avoid keeping connections open by using the described data model with such smart data sources. For example, the data model may be configured to check for updates from certain data sources, including such smart data sources based on the data items that are subscribed to at present or during a predetermined period.

Using an embodiment, metrics such as anticipated rate of change of data, probability of change, lifetime of the data, penalty for being out of date, value of being current, relative priority, and many other metrics that can be used for measuring or improving a mobile application's performance can be implemented. These and other metrics can form parameters of a data item that can be used in policies. The policies can then be used by the data manager according to an embodiment to prioritize, expedite, consolidate, or delay certain data access.

Furthermore, mobile applications can authenticate with the data manager for subscribing to data items. A combination of a subset of the application, the current user, installed certificates, answers to challenges (e.g. password), the device identity, history of previous actions, the current location, and the carrier, and many other factors can be used to determine entitlement to certain data items. For example, a combination of user actions (preferences, navigation, current view, location, etc.) and the nature of the application may used to allow or deny subscription to data items.

In addition to the processes described in this disclosure, the data manager of an embodiment may also use subscriptions, data item parameters, available data connectivity, available memory, and energy state of the mobile device to evict/purge and update data items in the data model.

An embodiment allows mobile applications to execute asynchronously and make requests to the data manager. The data manager returns data from data items to the requesting application without blocking data that may have unfavorable status indications, such as old or partial, or even invalid data, but such status indications assist the mobile application in deciding how to use the data.

The data manager performs asynchronous updates to data items as more recent data becomes available. The mobile applications can select appropriate actions based on data updates, such as whether to refresh a view.

An embodiment allows for providing cues, such as visual indications, in the mobile application based on the status indications of a data item. Such cues may be useful in keeping the end-user informed about the validity state of the data. For example, display intensity can be used to represent the probability of the data being current, guaranteed to be current, guaranteed to be out of date, and probability of being current. Any suitable manner of providing cues, such as visual, audible, or tactile can be similarly used in conjunction with the status indicators in mobile applications. For example, buttons may be grayed out to represent out of date data.

An embodiment may use a predictive algorithm to pre-fetch data based on data subscriber's profile, subscription history, current state of the data, and any other suitable factor.

An embodiment may also allow for peer-to-peer data caching, such as when multiple mobile devices are accessing the same data item and direct data links are available (e.g. Bluetooth connection) between the mobile devices. A data item stored in one mobile device's data model may be shared by that device's data manager to mobile applications executing in other mobile devices through the data managers executing therein. Data items can be populated in the data models of connected devices from other mobile devices instead of a data source. For peer-to-peer data caching, data items may be encrypted or signed during transmission.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable signal medium or a computer readable storage medium. A computer readable storage device may be an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The terms "computer readable storage device," "computer usable storage device," and "storage device" do not encompass a signal propagation medium, any description in this disclosure to the contrary notwithstanding.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method for managing data access in a mobile device, the method comprising:
    configuring, using a data manager executing in the mobile device, a data item in a data model, the data model being configured in the mobile device;
    identifying a source of data for the data item;
    determining an update method for the data item;
    determining an update frequency for the data item, wherein the source of data, the update method, and the update frequency are provided to the data manager and not to a mobile application executing in the mobile device;
    populating in the data model (i) a value parameter of the data item with data, (ii) a status parameter of the data item with a status indication indicating an age of the data item and a completeness of the data item, (iii) a subscription indicator indicating whether the data item has been subscribed to by the mobile application, (iv) a subscriber parameter identifying the mobile application that has subscribed to the data item, (v) a source parameter indicating a source of the data item, (vi) an update method parameter indicating an update method including a protocol to be used to acquire the data item from the source of the data item, and (vii) an update frequency of the data item indicating how often the data item should be updated;
    determining, in the mobile device and using the subscription indicator in the data model, whether at least one subscription to the data item is held by the mobile application executing in the mobile device;
    performing, responsive to determining that at least one subscription to the data item exists in the data model, an asynchronous update of the data item to include updated data in the value parameter, wherein performing the asynchronous update of the data item causes one of (i) a passive data source to appear as a first active data source to the mobile application, and (ii) a first update frequency of a second active data source to match a second update frequency of the mobile application;
    resolving, using the data manager at the mobile device, an update frequency discrepancy between the passive data source and the mobile application, wherein a source frequency at which the passive data source provides the updated data for the data item in the data model remains unchanged but the data manager pushes the data item update from the data model to the mobile application at a requested update frequency; and
    sending, responsive to the mobile application holding the at least one subscription, the updated data to the mobile application.

2. The computer implemented method of claim 1, further comprising:
    determining whether the status indication should be changed because of the asynchronous update, forming a status determination;
    adjusting the status parameter with a second status indication responsive to the status determination being affirmative;
    pushing, as a form of the sending, contents of the updated value parameter and the adjusted status parameter to the mobile application; and
    causing a use of the value parameter to change in the mobile application due to the adjusted status parameter.

3. The computer implemented method of claim 2, wherein the data in the value parameter is computed using the asynchronous update, further comprising:
    repeating the performing, the determining whether the status indication should be changed, and the adjusting responsive to an update frequency period specified for the data item elapsing.

4. The computer implemented method of claim 1, further comprising:
    receiving, from the mobile application executing in the mobile device, a request to unsubscribe from the data item;
    unsubscribing the mobile application from the data item;
    determining whether a second mobile application is subscribed to the data item;
    receiving an update for the data item responsive to the second mobile application being subscribed to the data item; and
    discontinuing the update for the data item responsive to no subscriptions remaining for the data item.

5. The computer implemented method of claim 4, wherein the mobile application and the second mobile application subscribe to receiving the updated data at different frequencies, wherein the performing the update for the data item occurs at a source's frequency, and wherein the updated data and the status indication are sent as push to the mobile application and the second mobile application at their respective frequencies.

6. The computer implemented method of claim 1, wherein the configuring configures a subset of a set of parameters of the data item, further comprising:
configuring, using the mobile application, another subset of the set of parameters of the data item, wherein the data item is not previously configured in the data model.

7. The computer implemented method of claim 1, further comprising:
using a policy to one of (i) adjust an update frequency of the data item, and (ii) prioritize an update of the data item.

8. The computer implemented method of claim 1, further comprising:
using a policy to determine the mobile application's entitlement to the data item, wherein the policy is used for denying the mobile application from subscribing to the data item.

9. The computer implemented method of claim 8, wherein the policy uses a combination of an identity of the mobile application, an identity of the mobile device, and a history of previous actions by the mobile application to determine the mobile application's entitlement.

10. The computer implemented method of claim 1, further comprising:
allowing a second mobile application executing in a second mobile device access to the data item by sending the data item to a second data manager in the second mobile device, the sending of the data item to the second data manager causing the second data manager to not receive an update to the data item from a designated source of the data item.

11. The computer implemented method of claim 1, wherein the data manager uses a combination of subscriptions to the data item, parameters of the data item, and available memory at the mobile device to purge the data item.

12. The computer implemented method of claim 1, further comprising:
provisioning of a cue at the mobile application based on a status indication in a status parameter of a particular data item, wherein the cue indicates in the mobile application that a value associated with the particular data item is out of date.

13. The computer implemented method of claim 1, further comprising:
pre-fetching an update for the data item, the pre-fetching being based on a subscription history of the data item.

14. A computer usable program product comprising a computer usable storage device including computer usable code for managing data access in a mobile device, the computer usable code comprising:
computer usable code for configuring, using a data manager executing in the mobile device, a data item in a data model, the data model being configured in the mobile device;
computer usable code for identifying a source of data for the data item; computer usable code for determining an update method for the data item;
computer usable code for determining an update frequency for the data item, wherein the source of data, the update method, and the update frequency are provided to the data manager and not to a mobile application executing in the mobile device;
computer usable code for populating in the data model (i) a value parameter of the data item with data, (ii) a status parameter of the data item with a status indication indicating an age of the data item and a completeness of the data item, (iii) a subscription indicator indicating whether the data item has been subscribed to by the mobile application, (iv) a subscriber parameter identifying the mobile application that has subscribed to the data item, (v) a source parameter indicating a source of the data item, (vi) an update method parameter indicating an update method including a protocol to be used to acquire the data item from the source of the data item, and (vii) an update frequency of the data item indicating how often the data item should be updated;
computer usable code for determining, in the mobile device and using the subscription indicator in the data model, whether at least one subscription to the data item is held by the mobile application executing in the mobile device;
computer usable code for performing, responsive to determining that at least one subscription to the data item exists in the data model, an asynchronous update of the data item to include updated data in the value parameter, wherein performing the asynchronous update of the data item causes one of (i) a passive data source to appear as a first active data source to the mobile application, and (ii) a first update frequency of a second active data source to match a second update frequency of the mobile application;
computer usable code for resolving, using the data manager at the mobile device, an update frequency discrepancy between the passive data source and the mobile application, wherein a source frequency at which the passive data source provides the updated data for the data item in the data model remains unchanged but the data manager pushes the data item update from the data model to the mobile application at a requested update frequency; and
computer usable code for sending, responsive to the mobile application holding the at least one subscription, the updated data to the mobile application.

15. The computer usable program product of claim 14, further comprising:
computer usable code for determining whether the status indication should be changed because of the asynchronous update, forming a status determination;
computer usable code for adjusting the status parameter with a second status indication responsive to the status determination being affirmative;
computer usable code for pushing, as a form of the sending, contents of the updated value parameter and the adjusted status parameter to the mobile application; and
computer usable code for causing a use of the value parameter to change in the mobile application due to the adjusted status parameter.

16. The computer usable program product of claim 15, wherein the data in the value parameter is computed using the asynchronous update, further comprising:
computer usable code for repeating the performing, the determining whether the status indication should be changed, and the adjusting responsive to an update frequency period specified for the data item elapsing.

17. The computer usable program product of claim 14, further comprising:
  computer usable code for receiving, from the mobile application executing in the mobile device, a request to unsubscribe from the data item;
  computer usable code for unsubscribing the mobile application from the data item;
  computer usable code for determining whether a second mobile application is subscribed to the data item;
  computer usable code for receiving an update for the data item responsive to the second mobile application being subscribed to the data item; and
  computer usable code for discontinuing the update for the data item responsive to no subscriptions remaining for the data item.

18. The computer usable program product of claim 17, wherein the mobile application and the second mobile application subscribe to receiving the updated data at different frequencies, wherein the performing the update for the data item occurs at a source's frequency, and wherein the updated data and the status indication are sent as push to the mobile application and the second mobile application at their respective frequencies.

19. The computer usable program product of claim 14, wherein the configuring configures a subset of a set of parameters of the data item, further comprising:
  computer usable code for configuring, using the mobile application, another subset of the set of parameters of the data item, wherein the data item is not previously configured in the data model.

20. The computer usable program product of claim 14, further comprising:
  computer usable code for using a policy to one of (i) adjust an update frequency of the data item, and (ii) prioritize an update of the data item.

21. The computer usable program product of claim 14, further comprising:
  computer usable code for using a policy to determine the mobile application's entitlement to the data item, wherein the policy is used for denying the mobile application from subscribing to the data item.

22. The computer usable program product of claim 21, wherein the policy uses a combination of an identity of the mobile application, an identity of the mobile device, and a history of previous actions by the mobile application to determine the mobile application's entitlement.

23. The computer usable program product of claim 14, further comprising:
  computer usable code for allowing a second mobile application executing in a second mobile device access to the data item by sending the date item to a second data manager in the second mobile device such that the second data manager does not have to receive an update to the data item from a designated source of the data item.

24. The computer usable program product of claim 14, wherein the data manager uses a combination of subscriptions to the data item, parameters of the data item, and available memory at the mobile device to purge the data item.

25. The computer usable program product of claim 14, further comprising:
  computer usable code for provisioning of a cue at the mobile application based on a status indication in a status parameter of a particular data item, wherein the cue indicates in the mobile application that a value associated with the particular data item is out of date.

26. The computer usable program product of claim 14, further comprising:
  computer usable code for pre-fetching an update for the data item, the pre-fetching being based on a subscription history of the data item.

27. The computer usable program product of claim 14, wherein the computer usable code is stored in a computer readable storage device in a data processing system, and wherein the computer usable code is transferred over a network from a remote data processing system.

28. The computer usable program product of claim 14, wherein the computer usable code is stored in a computer readable storage device in a server data processing system, and wherein the computer usable code is downloaded over a network to a remote data processing system for use in a computer readable storage device associated with the remote data processing system.

29. A data processing system for managing data access in a mobile device, the data processing system comprising:
  a storage device, wherein the storage device stores computer usable program code; and
  a processor, wherein the processor executes the computer usable program code, and wherein the computer usable program code comprises:
  computer usable code for configuring, using a data manager executing in the mobile device, a data item in a data model, the data model being configured in the mobile device:
  computer usable code for identifying a source of data for the data item;
  computer usable code for determining an update method for the data item;
  computer usable code for determining an update frequency for the data item, wherein the source of data, the update method, and the update frequency are provided to the data manager and not to a mobile application executing in the mobile device;
  computer usable code for populating in the data model (i) a value parameter of the data item with data, (ii) a status parameter of the data item with a status indication indicating an age of the data item and a completeness of the data item, (iii) a subscription indicator indicating whether the data item has been subscribed to by the mobile application, (iv) a subscriber parameter identifying the mobile application that has subscribed to the data item, (v) a source parameter indicating a source of the data item, (vi) an update method parameter indicating an update method including a protocol to be used to acquire the data item from the source of the data item, and (vii) an update frequency of the data item indicating how often the data item should be updated;
  computer usable code for determining, in the mobile device and using the subscription indicator in the data model, whether at least one subscription to the data item is held by the mobile application executing in the mobile device;
  computer usable code for performing, responsive to determining that at least one subscription to the data item exists in the data model, an asynchronous update of the data item to include updated data in the value parameter, wherein performing the asynchronous update of the data item causes one of (i) a passive data source to appear as a first active data source to the mobile application, and (ii) a first update frequency of a second active data source to match a second update frequency of the mobile application;

computer usable code for resolving, using the data manager at the mobile device, an update frequency discrepancy between the passive data source and the mobile application, wherein a source frequency at which the passive data source provides the updated data for the data item in the data model remains unchanged but the data manager pushes the data item update from the data model to the mobile application at a requested update frequency; and computer usable code for sending, responsive to the mobile application holding the at least one subscription, the updated data to the mobile application.

30. The data processing system of claim 29, further comprising:

computer usable code for determining whether the status indication should be changed because of the asynchronous update, forming a status determination;

computer usable code for adjusting the status parameter with a second status indication responsive to the status determination being affirmative;

computer usable code for pushing, as a form of the sending, contents of the updated value parameter and the adjusted status parameter to the mobile application; and computer usable code for causing a use of the value parameter to change in the mobile application due to the adjusted status parameter.

31. The data processing system of claim 30, wherein the data in the value parameter is computed using the asynchronous update, further comprising:

computer usable code for repeating the performing, the determining whether the status indication should be changed, and the adjusting responsive to an update frequency period specified for the data item elapsing.

32. The data processing system of claim 29, further comprising:

computer usable code for receiving, from the mobile application executing in the mobile device, a request to unsubscribe from the data item;

computer usable code for unsubscribing the mobile application from the data item; computer usable code for determining whether a second mobile application is subscribed to the data item;

computer usable code for receiving an update for the data item responsive to the second mobile application being subscribed to the data item; and computer usable code for discontinuing the update for the data item responsive to no subscriptions remaining for the data item.

33. The data processing system of claim 32, wherein the mobile application and the second mobile application subscribe to receiving the updated data at different frequencies, wherein the performing the update occurs at a source's frequency, and wherein the updated data and the status indication are sent as push to the mobile application and the second mobile application at their respective frequencies.

* * * * *